(12) United States Patent
Anderson et al.

(10) Patent No.: US 6,480,939 B2
(45) Date of Patent: Nov. 12, 2002

(54) METHOD AND APPARATUS FOR FILTERING PREFETCHES TO PROVIDE HIGH PREFETCH ACCURACY USING LESS HARDWARE

(75) Inventors: James R. Anderson, San Jose; Jeff J. Baxter, Los Gatos; Ernest T. Lampe, Sunnyvale, all of CA (US)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 09/751,800

(22) Filed: Dec. 29, 2000

(65) Prior Publication Data
US 2002/0129205 A1 Sep. 12, 2002

(51) Int. Cl.$^7$ ................................................ G06F 12/00
(52) U.S. Cl. ........................................ 711/137; 711/213
(58) Field of Search ................................. 711/156, 213, 711/137; 712/207

(56) References Cited
U.S. PATENT DOCUMENTS
5,774,685 A * 6/1998 Dubey ........................ 711/137
6,055,621 A * 4/2000 Puzak ........................ 712/207

* cited by examiner

Primary Examiner—Jack A. Lane
(74) Attorney, Agent, or Firm—Blakely, Sokoloff, Taylor & Zafman LLP (57) ABSTRACT

In general, the PBVT structure provides an effective method of filtering a stream of hardware generated prefetches by eliminating prefetch addresses that have proven to be inaccurate in the past. When compared to a design that uses a PFB of equal number of entries, the PBVT along with a small PFB provides virtually equivalent prefetch accuracy and miss rate reduction while using much less hardware area (97% less data storage space for a 1024-entry PFB case).

32 Claims, 11 Drawing Sheets

METHOD AND APPARATUS FOR FILTERING PREFETCHES TO PROVIDE HIGH PREFETCH ACCURACY USING LESS HARDWARE

FIELD OF THE INVENTION

The present invention relates to an apparatus and method for caching program instructions in a processor system. More particularly, the present invention is a new method for providing high prefetch accuracy while using less hardware than previous methods.

BACKGROUND OF THE INVENTION

A computer system, in its most essential from, comprises of a processor, a main memory and an I/O device with which the computer system communicates with an end-user. The end-user provides the computer system with a program comprising a set of instructions or codes directing the processor to perform different tasks. Generally, the tasks involve manipulating data that is provided to the computer system by the end-user. Both the data and the codes are stored in the main memory which is typically a Dynamic Random Access Memory or DRAM. The processor has to fetch the codes and the data, manipulate it according to the program, and then store the result back in the DRAM.

Both the processor and the memory have become faster and faster as the technology has advanced in the field of electronics. However, the speed with which today's processors are able to execute instructions remains much faster relative to the speed with which the memory is able to deliver stored data. This difference of speed, referred to as memory latency, causes an obvious problem. The processor has to remain idle while it is waiting for the slower memory to make the next piece of data available. Reducing memory latency is of great interest to computer users because it will result in improving the overall performance of the computer system.

One way to reduce memory latency is to utilize a faster intermediate level of memory known as Cache. Cache is a fast memory storage device that stores blocks of data and codes recently used by the processor. However, cache is also more expensive, and thus only a relatively small size cache is used in conjunction with the DRAM. The way Cache works is as follows. When the processor requests data, that data is transferred from DRAM to cache and then from cache to the processor. This way a copy of the data will remain in cache. On the next processor request for data, the much faster cache is checked prior to sending the request to DRAM to see whether the requested data is available locally in cache. If it is, then there is no need to retrieve the data from the DRAM and the processor can get its request filled at the cache (a cache hit). On the other hand, when the cache does not contain the requested data or code, a cache miss occurs. In this case, the data must be retrieved from the DRAM, and the processor is unable to save any time as it would through a cache hit. Thus it is extremely desirable to reduce cache misses or increase cache hits.

Several methods have been suggested to reduce cache misses. For example, hardware prefetching can be an extremely effective technique for reducing cache misses. One of the most common prefetching techniques, known as inline or next-in-sequence, is to prefetch the next consecutive cache line on a cache access. For example, if the processor requests data stored in cache line X, then the hardware generates a prefetch for cache line X+1. The hardware is guessing that the program will want the following cache line next. If the guess is correct, then prefetching has avoided a cache miss. Eliminating cache misses reduces the effective memory latency and has a positive impact on overall system performance. However, if the guess was incorrect and the cache line X+1 is not used by the processor, then the prefetch has been a waste and could have actually caused harm to system performance by clogging the paths between the processor and the memory.

Performance could also be degraded by a condition commonly referred to as cache pollution. When a prefetched cache line is placed in the cache, another cache line must be evicted in order to make room for the new entry. If the prefetched line is subsequently used by the processor, a miss has been avoided and performance is improved. However, if the processor never requests the prefetched line but instead requests the cache line that was evicted, then a cache miss has been created. Cache pollution occurs when the hardware prefetcher fills the cache with unused prefetches and generates additional cache misses. If the cache becomes too polluted, the miss rate will increase and prefetching will actually have a negative impact on performance.

A common method of preventing cache pollution is through the use of a Prefetch Buffer (PFB). When a prefetch request returns from memory, the prefetched data is stored in the PFB, instead of the cache. When the processor requests data, both the cache and the PFB are searched to see whether the data is available. If the data is found in the PFB, the prefetched data is transferred to the cache. This guarantees that only data that has been requested by the processor resides in the cache, and prevents cache pollution ensuring that no matter how inaccurate the hardware prefetcher, it will not increase the cache miss rate.

Although the PFB is a very effective filtering mechanism it is highly inefficient. Each entry requires both an address tag of usually around 10 bits and a 32-byte cache line to be stored. However, a large portion of the entries do not get used by the processor. Entries that do not get used are wasted data storage space. Although the address tag of a bad prefetch may be used to prevent prefetching to the same address again, the 32-bytes of data stored for the bad prefetch is a complete waste of hardware space. It would be desirable to accomplish the same filtering results but with less hardware.

BRIEF DESCRIPTION OF THE DRAWINGS

Other objects and advantages of the invention will become apparent upon reading the following detailed description and upon reference to the drawings in which.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances, well known methods, procedures, components, and circuits have not been described in detail so as not to unnecessarily obscure aspects of the present invention.

The present invention includes various steps, which will be described below. The steps of the present invention may be performed by hardware components or may be embodied in machine-executable instructions, which may be used to cause a general-purpose processor programmed with the instructions to perform the steps. Alternatively, the steps may be performed by a combination of hardware and software. Importantly, while embodiments of the present invention will be described with reference to a unified cache with 4-way set associativity, the method and apparatus described herein are equally applicable to any type of caching strategy and in any memory hierarchy.

The present invention employs a Prefetch Buffer Victim Table (PBVT) in conjunction with a small PFB. The combination PFB-PBVT provides prefetch performance (cache miss reduction and prefetch accuracy) equivalent to that of a PFB without a PBVT, the PFB having the same number of entries. However, a PBVT design uses only a fraction of the data storage space used by a PFB design. For example, a design that uses a 224-entry PBVT combined with a small 32-entry PFB provides nearly the same prefetch performance as a 256-entry PFB, but uses only 12% of the data storage space used by the 256-entry PFB. Thus, using a PFB-PBVT combination provides a large hardware area savings over a standard PFB, i.e., a PFB without a PBVT approach.

The majority of prefetches are used by the processor soon after they are prefetched. However, bad prefetch entries (those prefetches that never get used) may be used to filter repeated bad prefetches long after the first bad prefetch. For a more efficient use of space with a similar filtering capability, a small PFB can be used in conjunction with a PBVT to maintain the same accuracy and filter rate with a much smaller structure. The small PFB is used to hold recent prefetches that are likely to be used by the processor. When an entry in the PFB is replaced, or victimized, by a new prefetch, the address of the old prefetch is considered to be a bad prefetch address and is placed in the PBVT. When a new prefetch address is generated by a prefetch address predictor, it will be rejected if the new prefetch address is found in the cache, PFB, or PBVT. The main advantage of the PBVT is that the PBVT only holds a 10-bit address tag for each entry and not the associated 32-byte cache line and is thus much smaller in size than a PFB with the same number of entries.

Figure 1:
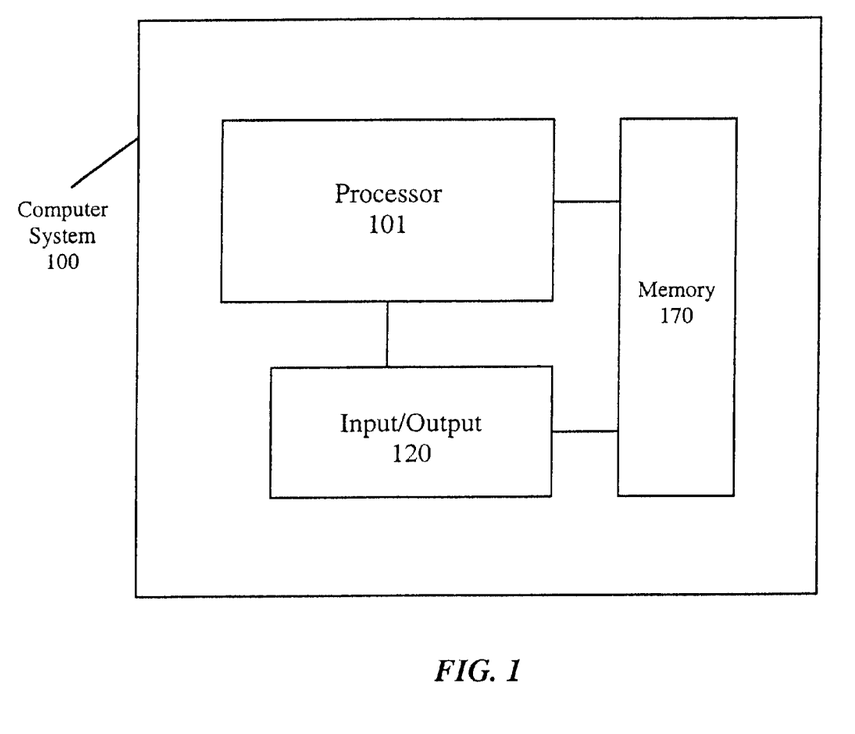
FIG. 1 illustrates a block diagram of a typical computer system.

Referring now to FIG. 1, a block diagram of a typical computer system 100 in which the present invention is utilized is illustrated. The computer 100 includes a processor 101, Input/Output devices 120 such as keyboard, modem, printer, external storage devices and the like, and memory 170 such as DRAM.

Figure 2A:
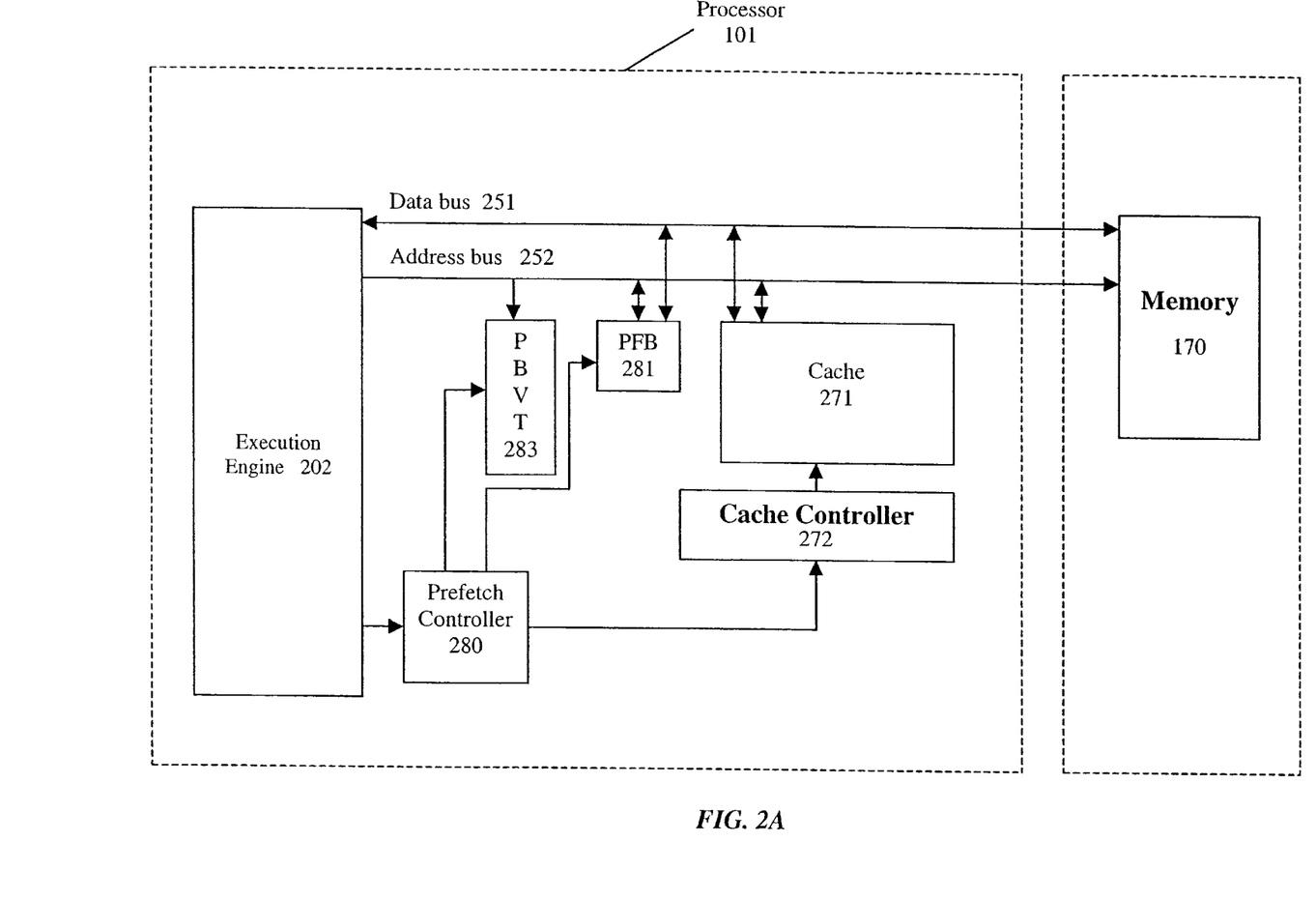
FIG. 2A illustrates a block diagram of a processor that utilizes a PFB and a PBVT employing an embodiment of the present invention.

Referring now to FIG. 2A, a processor 101 of the invention is shown. The processor 101 includes an execution engine 202, a prefetch controller 280, a PBVT 283, a PFB 281, a cache 271, and a cache controller 272. The processor 101 is also interfaced with a memory 170 via data bus 251 and address bus 252. In this embodiment of the present invention, the prefetch controller 280, the PFB 281, the PBVT 283, the cache 271, and the cache controller 272 are located on the same semiconductor die containing the execution engine 202. The cache 271 is coupled to the execution engine 202 and memory 170 via data bus 251 and address bus 252. The cache controller 272 controls the operation of the cache 271 and coordinates cache operations with the execution engine of the processor 101. Connections between the cache controller 272 and other elements that are not immediately relevant to the present invention have been omitted to avoid obscuring the disclosure of the invention. For example, the cache controller 272 will typically control an address bus driver and a data bus driver to couple the processor 101 to a system bus when access to the memory 170 is required, and to decouple the data and address busses 251 and 252 when the cache 271 can handle the memory transaction. This embodiment of the present invention is referred to as an on-chip design.

During the execution of a program, the execution engine 202 issues a request for data. The cache controller 272 recognizes the request and immediately begins searching the cache 271 for the requested data. Recently used data is stored in the cache 271 because there is a high likelihood that the same data will be requested by the processor 101 soon. If the cache controller 272 finds the requested data at the cache 271, then the data is placed on the data bus 251 and sent to the execution engine of the processor 101. Otherwise, the cache controller 272 will issue a cache miss signal to the prefetch controller 280. The prefetch controller 280 will then search the PFB 281 to determine whether it contains the requested data. If the PFB 281 contains the data requested by the execution engine of the processor 101, then the data is promoted to cache 271. The cache controller 272 will sense that the data is now available at the cache 271, and subsequently places the data on the data bus 251 on its way to the execution engine of the processor 101. However, if the PFB 281 does not contain the requested data, then the prefetch controller 280 will retrieve the requested data from the memory 170 and update the cache 271 with the newly retrieved data.

As the number of memory requests from the execution engine 202 increases, the cache 271 and the PBF 281 will eventually get filled to capacity with data. Subsequently, a replacement algorithm has to be used to evict entries from the PBF 281, and the cache 271 in order to make room for new data being transferred from the memory 170. For example, the entry in the cache 271 which was least recently used can be the entry that gets replaced. This replacement algorithm is known as Least Recently Used (LRU) replacement algorithm and is the proffered algorithm for the present invention. However, those skilled in the art recognize that other replacement algorithms known in the art can be used without impacting the effectiveness of the present invention.

Every time the execution engine 202 issues a request for data, the prefetch controller 280 generates a prefetch address. The prefetch controller 280 uses one of several well known methods of prefetching techniques. One of the most common methods of determining which data to prefetch next is known as inline or next-in-sequence prefetching. According to this method, the prefetch controller 280 increments the address of the current request by the processor to generate the new prefetch address. Before prefetching, the prefetch controller 280 checks to see if the next cache line is available either in the cache 271 or the PFB 281. If the data is already contained in either of the cache 271 or PFB 281, then the prefetch controller squashes the prefetch. Otherwise, the prefetch data is retrieved from the memory 170 and is stored in the PBF 281 until the processor 101 requests the line. If the processor 101 never requests the prefetched line (which is considered an inaccurate or bad prefetch), it will eventually be evicted from the PFB 281.

It is appreciated that each of the functional units described above may be implemented with hard wired circuitry, Application Specific Integrated Circuits (ASICs), Programmable Logic, by causing a processor to execute instructions, or a combination thereof. Importantly, the present invention is not limited to a particular implementation of these functional units.

Figure 2B:
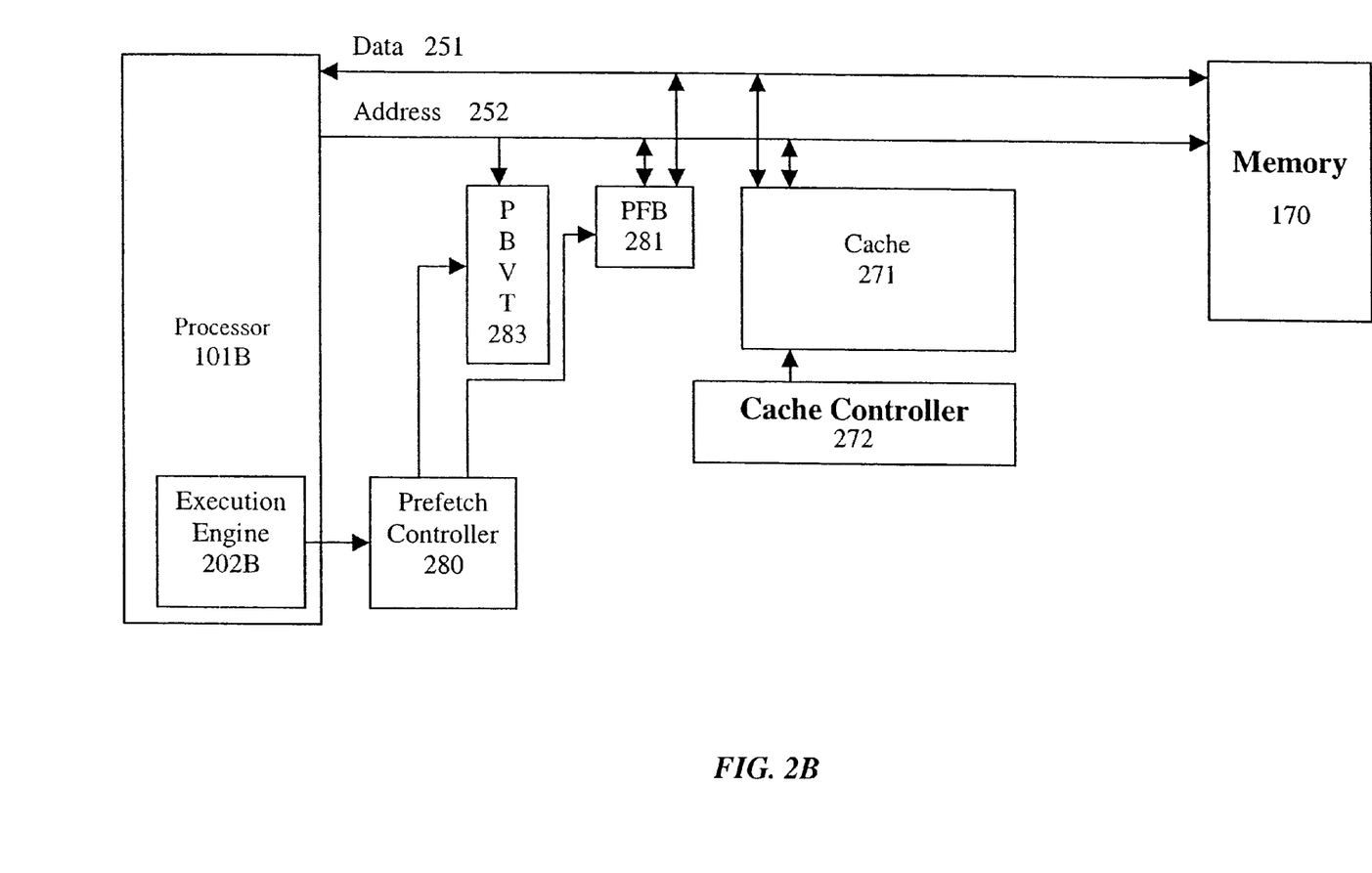
FIG. 2B illustrates a block diagram of a processor that utilizes a PFB and a PBVT employing an alternative embodiment of the present invention.

Referring now to FIG. 2B, an alternative embodiment of the present invention is shown. In this embodiment, the prefetch controller 280, the PFB 281, the PBVT 283, the cache 271, and the cache controller 272 are located external to the semiconductor die containing the execution engine 202B and processor 101B. This embodiment is typically referred to as an off-chip design. The present invention can be implemented in either an on-chip or an off-chip design.

Figure 3A:
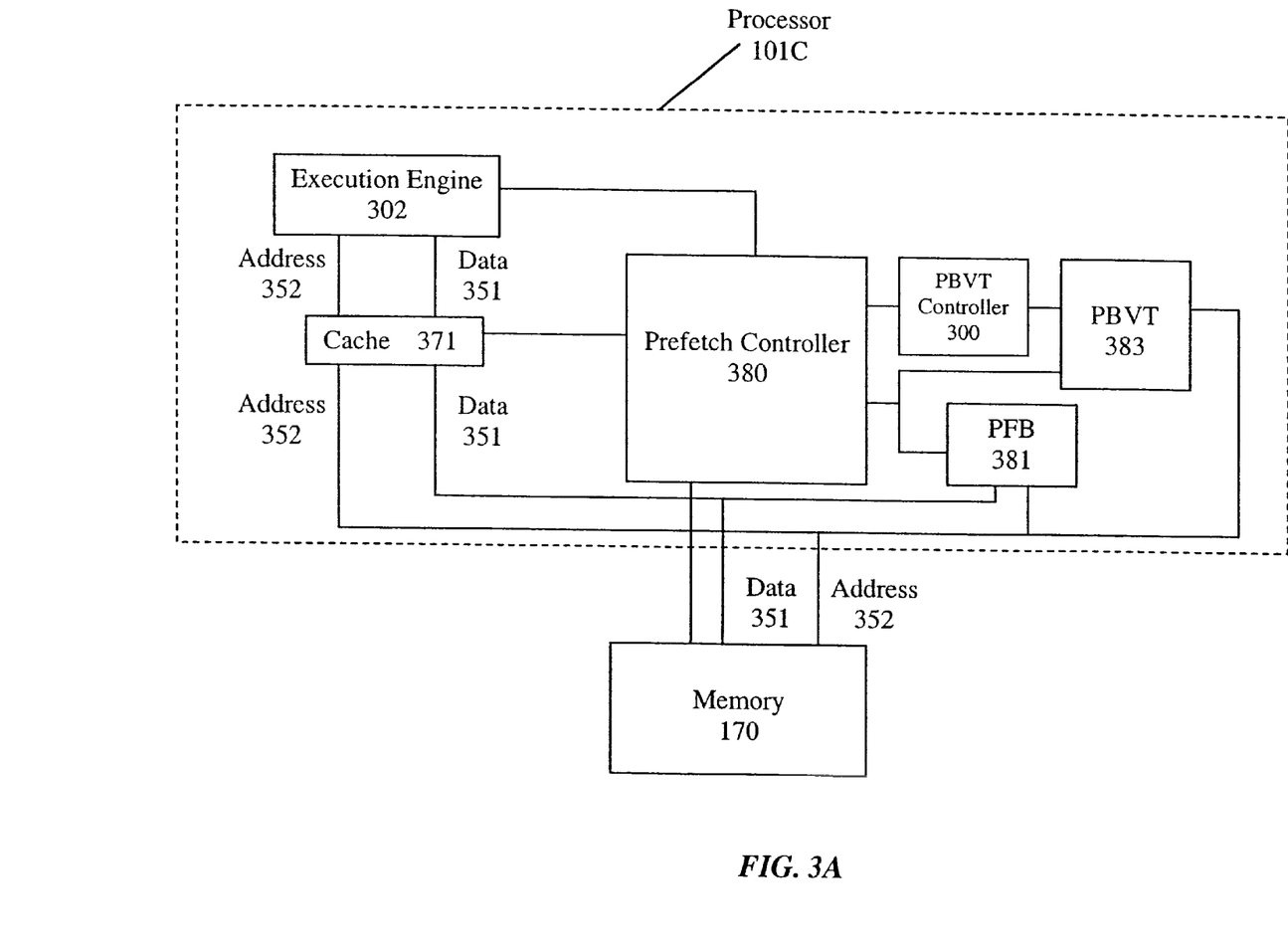
FIG. 3A illustrates a block diagram of a processor that utilizes a PFB, a PBVT, and a PBVT controller employing an alternative embodiment of the present invention.

Referring now to FIG. 3A, another embodiment of the present invention is shown. In this embodiment, a PBVT controller 300 is coupled to the PBVT 383 and the prefetch controller 380. Once the prefetch controller 380 has determined that an entry of the PFB must be evicted in order to make room for a new entry, the address of the evicted entry is stored in the PBVT 383. The PBVT 383 essentially keeps a list of the addresses that have been evicted from the PFB 381, which are considered incorrect prefetches or "bad" prefetches. When the prefetch controller 380 generates a new prefetch address it checks the PBVT 383 before sending the prefetch to memory 370. If the prefetch address is in the PBVT 383, then the prefetch is not issued since this address has already been incorrectly prefetched in the past. Thus, the PBVT 380 filters out those addresses that are known to be bad prefetches.

Figure 3B:
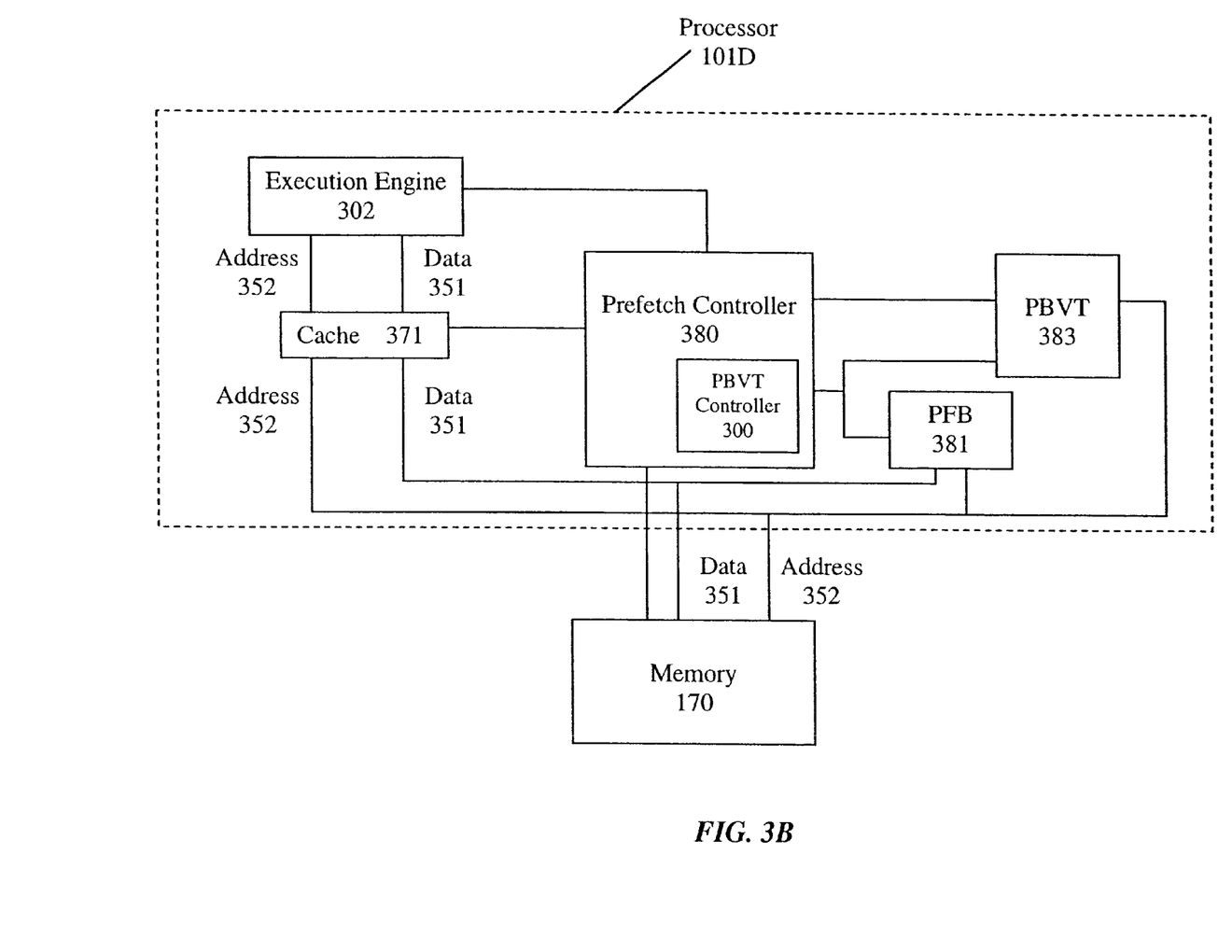
FIG. 3B illustrates a block diagram of a processor that utilizes a PFB, a PBVT, and a PBVT employing an alternative embodiment of the present invention.

Referring now to FIG. 3B, yet another embodiment of the present invention is shown. In this embodiment the PBVT controller 300 is shown as part of the prefetch controller 380.

Figure 3C:
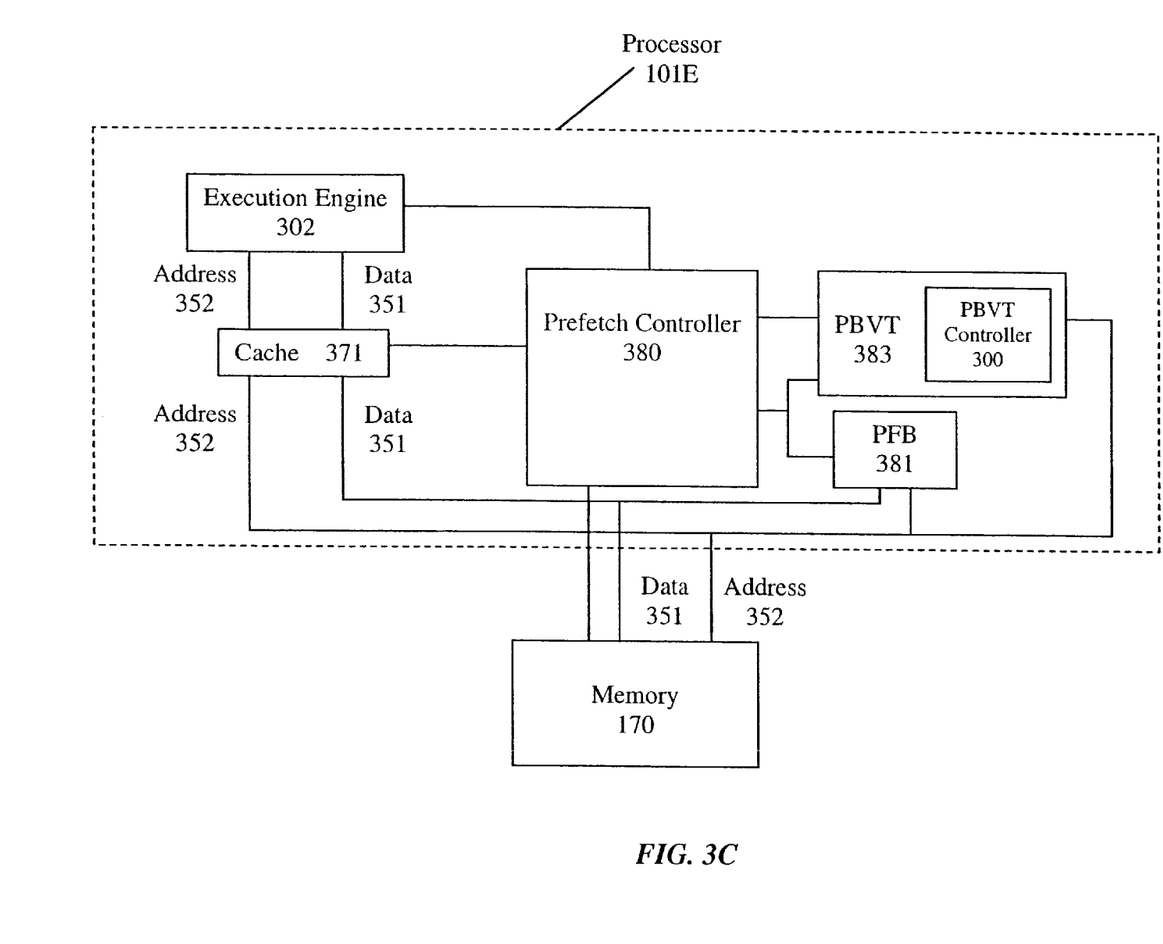
FIG. 3C illustrates a block diagram of a processor that utilizes a PFB, a PBVT, and a PBVT controller employing an alternative embodiment of the present invention.

Referring now to FIG. 3C, still another embodiment of the present invention is shown. In this embodiment, the PBVT controller 300 is shown to be part of the PBVT 383.

Figure 4:
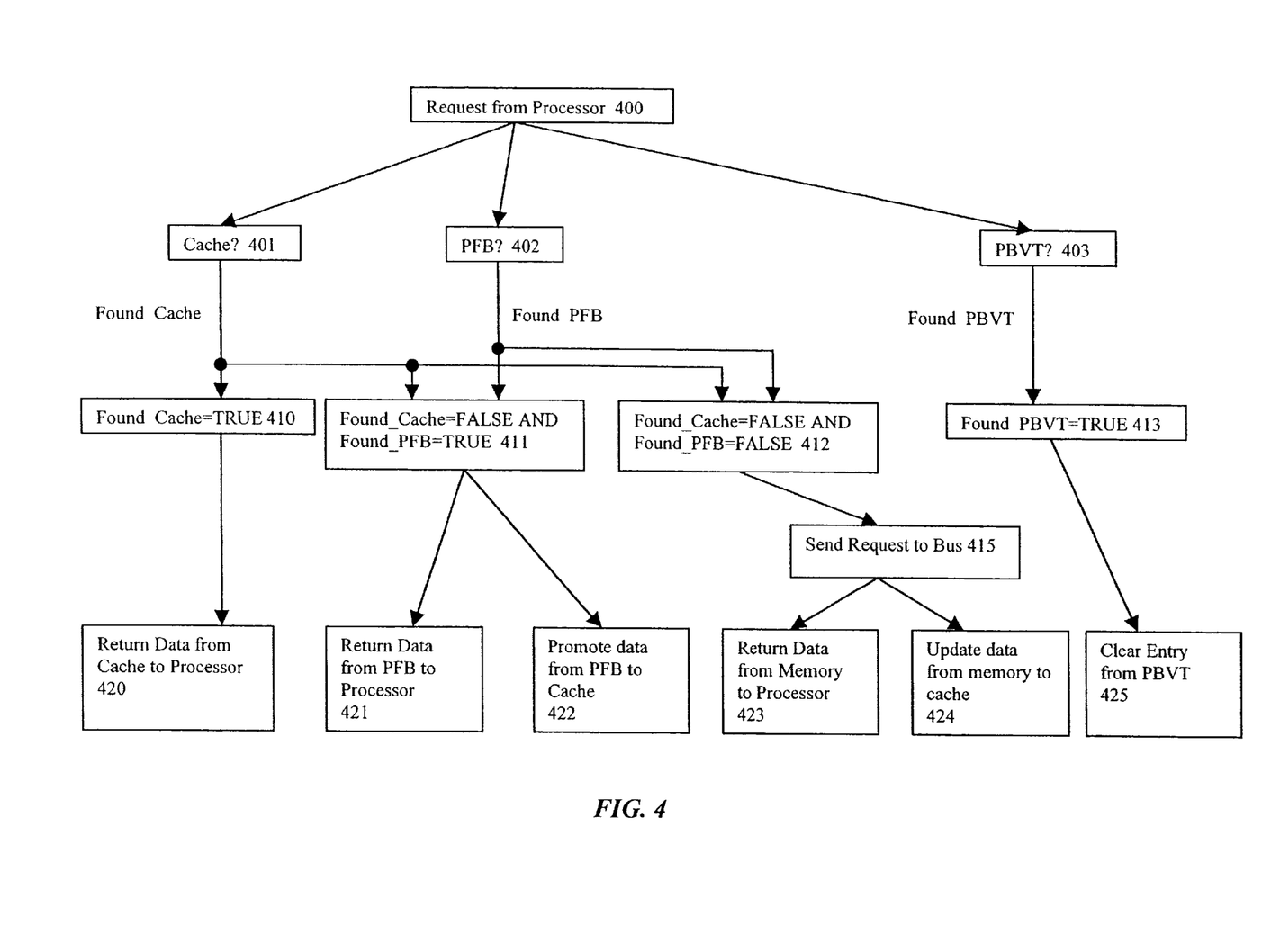
FIG. 4 illustrates a flow diagram of a method to process a memory request from a processor according to the present invention.

Referring now to FIG. 4, a flow diagram of a method to process a memory request from a processor according to the present invention is shown. This figure is best illustrated in conjunction with FIG. 2A, a block diagram of a computer system according to an embodiment of the present invention. In step 400 of FIG. 4, a request for data is issued by the execution engine 202. Before sending the request to the memory, the execution engine 202 will issue a signal to the cache controller 272, as well as the prefetch controller 280 to determine whether the requested data already exists in either the cache 271 or the PFB 281. If the requested data is in either one of them, then there is no need to issue the request to the memory. This search of the cache and the PFB 281 can be done in parallel as is shown in steps 401 and 402. Alternatively the cache 271 may be searched prior to the PFB 281 being searched (not shown in FIG. 4).

In step 410 the requested data is found to be in the cache 271 (a cache hit). Therefore in step 420 the requested data is returned to the execution engine 202B and the process is completed. If, on the other hand, the data is not present in the cache 271, then in step 402, a search is done at PFB 281. In step 411, it is determined that the PFB 281 contains the requested data. In step 421, the requested data is returned to processor 101B while in step 422, the requested data is also promoted to cache 271. If the requested data is neither in the cache 271 nor in the PFB 281 (step 412) then the requested data must be retrieved directly from the memory 170. Thus in step 415, a request is sent to the memory 170. In step 423, the data is returned to the execution engine 202B while in step 424 the cache is also updated with the new data. One last thing must occur before the process is completed. If the address of the requested data is contained in the PBVT 283, the address must be cleared. Essentially this corrects any addresses that were mistakenly placed in the PBVT because they were victimized from the PFB before the processor could use them.

For example, a cache line X is prefetched and placed in the PFB. Sometime later, X is chosen for replacement and sent to the PBVT. However, the processor now requests X. If X were still in the PFB, a miss would be avoided, but because the line was victimized from the PFB too early, it now resides in the PBVT. To prevent X from not being rejected by the PBVT in the future, it must be cleared. Accordingly, in step 403 the PBVT is checked for the address, and if the address is found in the PBVT (step 413) the entry is cleared in step 425.

Figure 5:
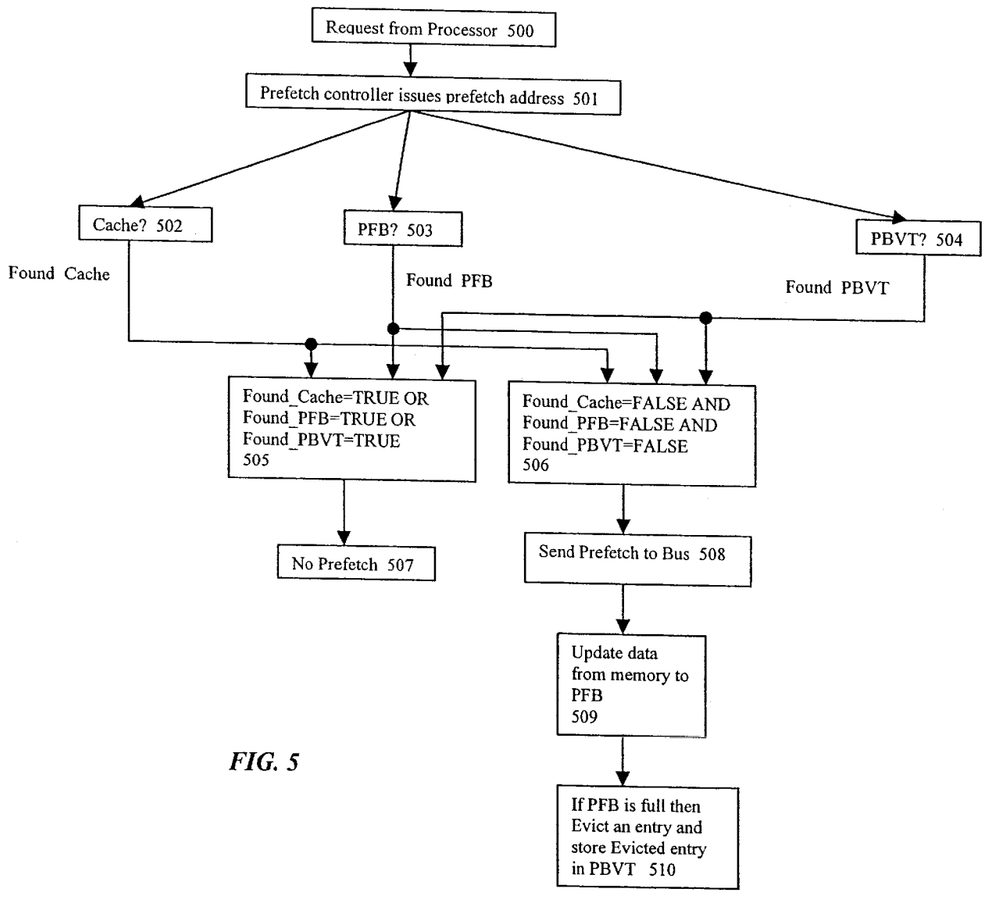
FIG. 5 illustrates a flow diagram of a method to prefetch utilizing a PBVT according to the present invention.

Referring now to FIG. 5, a flow diagram of a method to prefetch data utilizing a PBVT according to the present invention is shown. This figure is best illustrated. in conjunction with FIG. 2A, a block diagram of a computer system according to an embodiment of the present invention. In step 500 of FIG. 5, a request for data is issued by the execution engine 202. In step 501, the prefetch controller 280 generates an address according to a prefetching technique. Although the particular kind of prefetching technique used does not affect the method of the present invention, the inline or next-in-sequence type of prefetching is the preferred technique according to the method of the present invention.

An example is illustrative. Assume that the address of the requested data is X. Accordingly in step 501, the prefetch controller 280 generates the prefetch address X+1 since the next line following memory address X is memory address X+1. In effect, the prefetch controller is guessing that if the processor needs the data stored in location X, there is a high likelihood that it will also need the data stored in location X+1.

However, before prefetching the contents of memory location X+1, the prefetch controller needs to determine whether the data stored in location X+1 has been previously prefetched, and if it has then there is no need to prefetch the same data again. There are three places that help the prefetch controller make the determination whether to prefetch or not: (1) cache 271, (2) PFB 281, and (3) PBVT 283. Thus in step 502, 503, and 504 a search of the cache 271, the PFB 281, and the PBVT 283 is done in parallel to see whether the requested data (or the address of the requested data in the case of the PBVT) is contained in the three storage devices mentioned. Alternatively, the search of the three storage devices can be done one after another.

If the data stored in location X+1 is found either in the cache (step 502) or in the PFB (step 503) or if the PBVT 283 contains the address X+1 (step 504) then no prefetch is necessary, and in step 507 the process for prefetching location X+1 is terminated. The reason for this outcome is that obviously if the data is found in the cache there is no need to prefetch it. If the data is already in the PFB, there is no need to prefetch it. And, finally since the PBVT holds only address tags previously evicted from the PFB because they were determined to be bad prefetches, there is no need to tie up bandwidth by prefetching them again. In other words, the processor has kept a list of bad prefetches and the prefetch controller consults this list before prefetching in order to filter out bad prefetches.

On the other hand, in step 506, if the data corresponding to address X+1 is not found in either the cache 271 or the PFB 281, and the PBVT does not contain X+1 either, then the prefetch controller 272 will prefetch the data in step 508 and store it in the PFB 281 in step 509. The fact that the PBVT 283 did not contain X+1, signals the prefetch controller 280 that X+1 is a good prefetch and accordingly it will be prefetched. However, the process is not yet completed. One more event needs to occur. If the PFB 281 is filled to capacity, the newly prefetched data of location X+1 must replace a previously prefetched data along with its corresponding address from the PFB 281 in order to make room for the new entry. Several techniques are used to determine which entry will be evicted or victimized. For example, the entry that was least recently used could be evicted. Regardless of which replacement algorithm is used, the victimized entry represents a bad prefetch because it was never used. Accordingly the evicted entry is a bad prefetch and only the address of this entry is sent to the PBVT 283. The PBVT 283 thus contains bad prefetches and the prefetch controller 272 can search the PBVT 283 and not re-prefetch the same location again. It is noteworthy that the PBVT 283 does not need to, and in fact it does not, contain the data corresponding to a bad prefetch address. That is how the PBVT 283 accomplishes the hardware area savings that it does. For example, a design that uses a 224-entry PBVT with a small 32-entry PFB provides nearly the same prefetch performance as a 256-entry PFB, but uses only 12% of data storage space used by the 256-entry PFB.

Figure 6A:
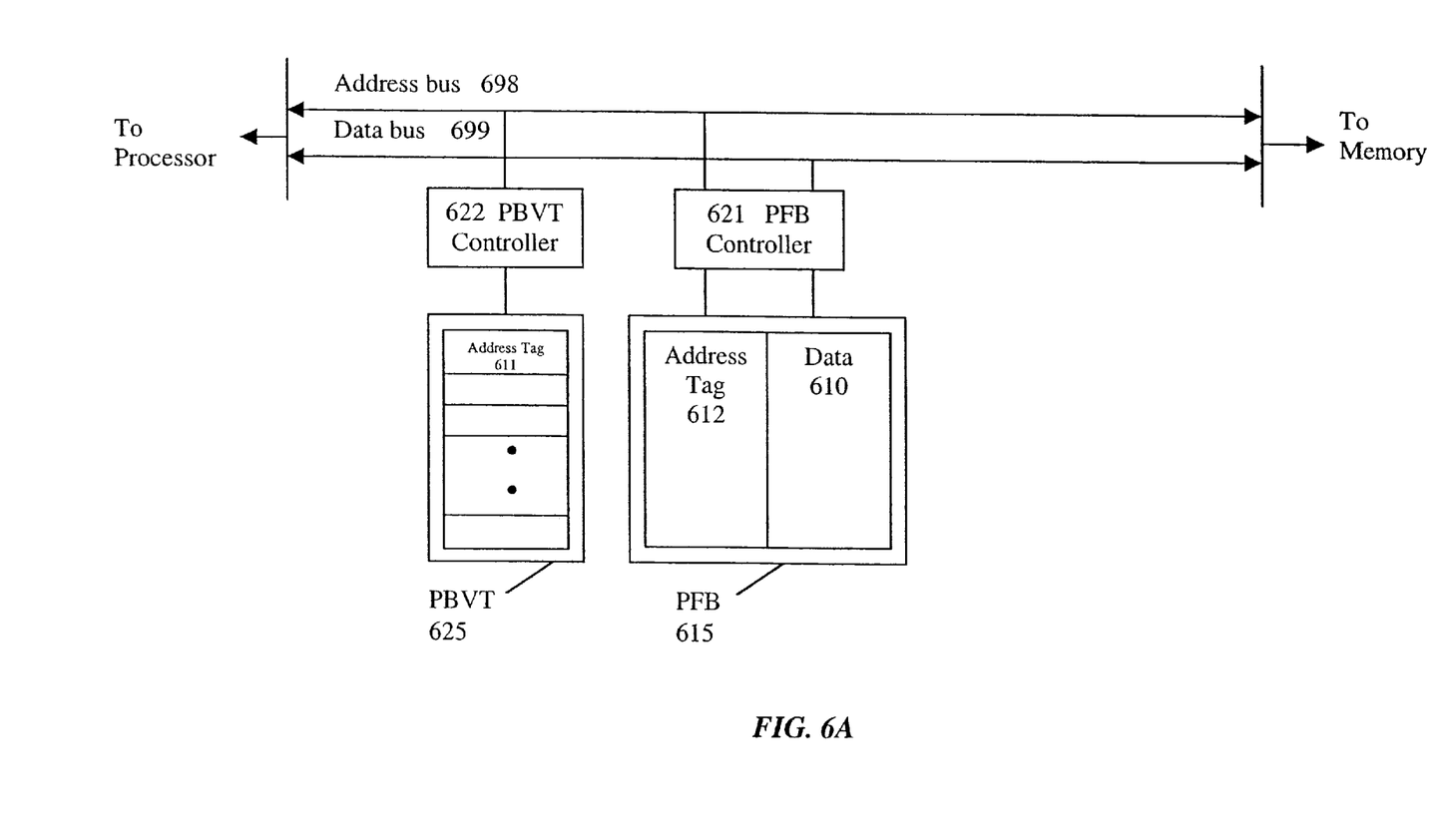
FIG. 6A illustrates a detailed block diagram of the PFB-PBVT combination.

Referring now to FIG. 6A, a detailed block diagram of the PFB-PBVT combination is shown. The PBVT 625 is coupled to the PFB 615 and cache 600. As FIG. 6A shows, the PFB 615 contains both address tags 612 and the corresponding data bits 610 in each of the 32 rows. Thus, in this embodiment the PFB 615 is a 32-entry buffer. When all 32 rows are occupied and a new entry needs to be stored in the PFB 615, one entry must be evicted. Different replacement algorithms can be used to decide which entry should be replaced. Regardless of the replacement algorithm used, the evicted entry's address tag 611 without the data bits 610 is sent to the PBVT 625 for storage. The reason that the address tag 611 is stored in the PBVT 625 is so that a history of evicted PFB entries can be kept. This history is later checked to determine whether a future prefetch should take place or not. If a future prefetch address is found at the PBVT 625, then that prefetch address is considered a bad prefetch address (since it was never needed) and there is no need to prefetch it. True, the same task could have been accomplished without the PBVT since, if the prefetch address was already in the PFB, there would be no need to prefetch it. But, using the PBVT saves valuable hardware space since only the address tag 611 and not the data bits 610 is being stored.

Figure 6B:
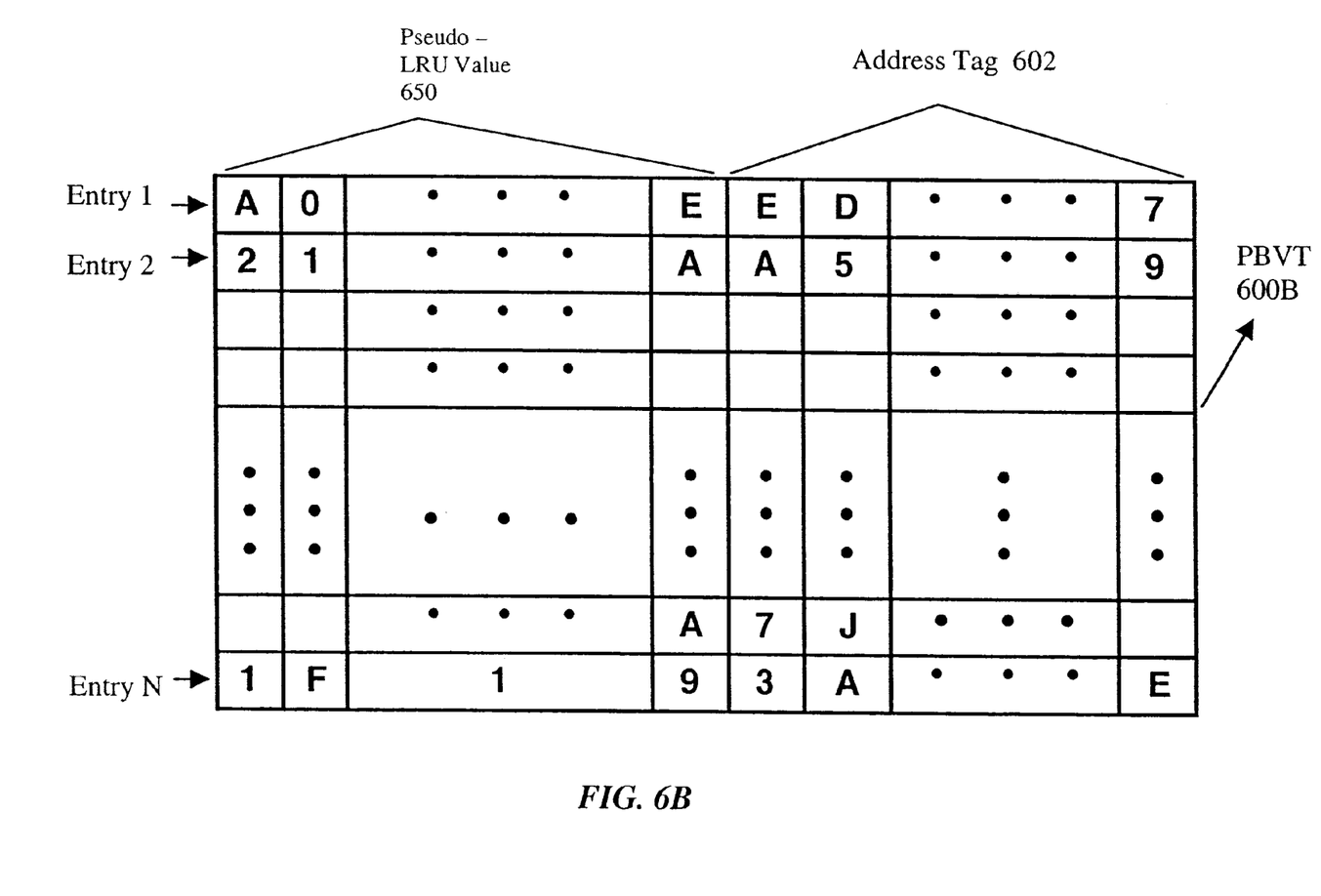
FIG. 6B illustrates the contents of a PBVT according to the present invention.

Referring now to FIG. 6B, the contents of the PBVT 600B is shown. In this embodiment of the present invention, the PBVT 600B is a table containing M columns and N rows. Each row includes two entries. The first entry is the prefetch address tag 602. This is the address tag that has been evicted from the PFB, i.e., the bad prefetch. The second entry is a corresponding Least Recently Used (LRU) Value 650 which indicates the relative age of the bad prefetch. The LRU Value is used to determine which PBVT address tag 602 will be replaced once the PBVT is full i.e., the PBVT has no available memory locations, and a new address tag entry must be stored. Those skilled in the art will recognize that there are several well known replacement algorithms such as, a simple LRU, a psuedo-LRU, and random replacement algorithm as well as other replacement algorithms. The present invention is not limited to any specific type of replacement algorithms. However, for the purposes of illustration only, the least recently used (LRU) replacement algorithm is used in this embodiment.

To further illustrate, assume there are 1024 prefetch address tags stored in the PBVT 600B. Every time the PBVT 600B is searched for a match, all of the 1024 entries that do not match have their corresponding LRU Value 650 incremented by one. Thus if after 10 searches, a given entry has never been matched, its corresponding LRU Value 650 will be 10. On the next search if the search still does not result in a match with this particular entry, then its corresponding LRU Value 650 is incremented to 11 and so on. The LRU Value 650 is used to determine which entry should be evicted once the PBVT 600B has reached maximum capacity. The PBVT 600B assumes a fully associative implementation of the PBVT. If the PBVT were direct mapped, there would be no need for the LRU Value 650.

Figure 6C:
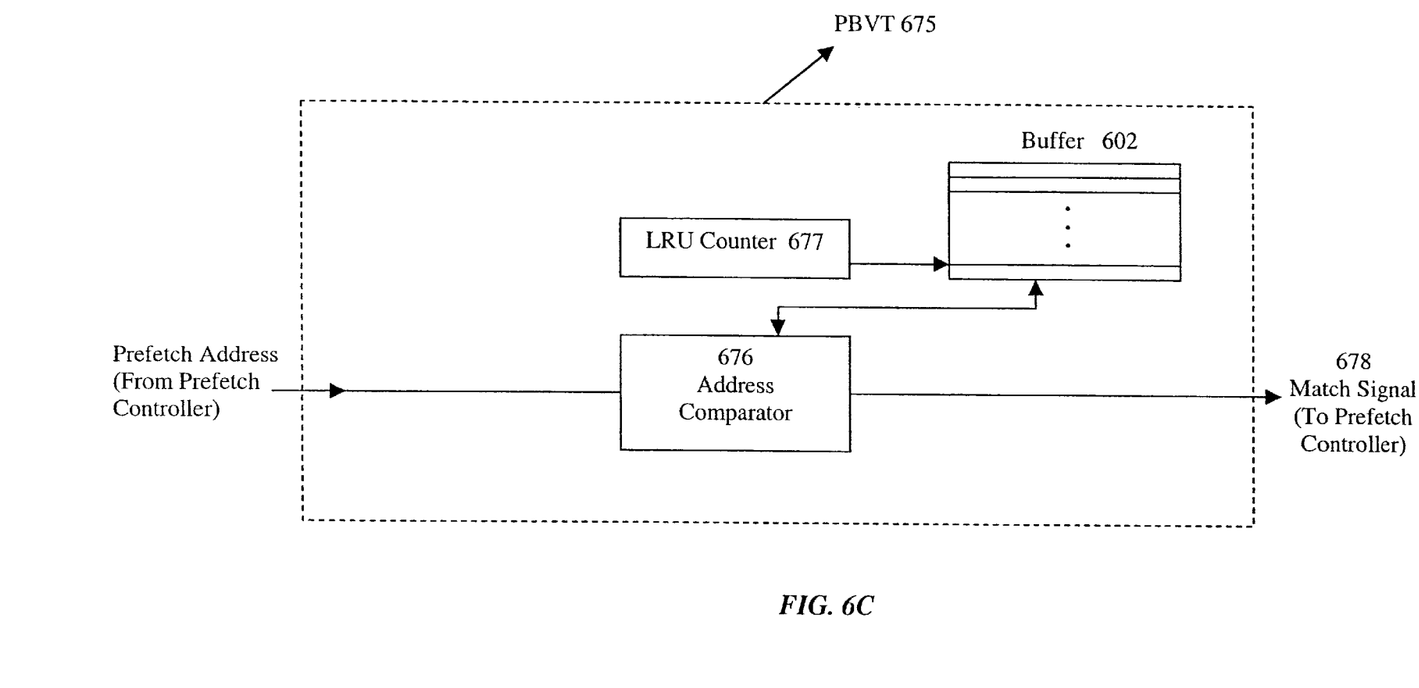
FIG. 6C illustrates another embodiment of the PBVT including a PBVT controller.

Referring now to FIG. 6C, a PBVT is illustrated. In this embodiment of the present invention the PBVT controller is shown as part of the PBVT. The PBVT 675 includes a Buffer 602, an Address Comparator 676, and an LRU Counter 677. The Address Comparator 676 compares the prefetch address provided by a prefetch controller (not shown) with each entry of the Buffer 602. If the comparison results in a match then the Address Comparator 676 generates a Match Signal 688 to the prefetch controller. This signal will be used by the prefetch controller to squash a prefetch. Meanwhile, the LRU Counter 677 increments an LRU Value corresponding to each entry of the Buffer 602 every time the Address Comparator 676 does a comparison that does not result in a match. The LRU Value 650 is used to determine which entry should be evicted next.

Using a small prefetch buffer with a PBVT provides a better filter rate and almost the same prefetch accuracy as a prefetch buffer alone. For a closer inspection of the accuracy and filter rate differences, Table 1 shows the accuracy, miss rate reduction, and filter rate measurements for four different workloads for a 1 MB cache with two different configurations: (1) PFB=1 k which represents a 1024-entry PFB without a PBVT, and (2) PFB=32, PBVT=992 which represents a 32-entry PFB and a 992-entry PBVT. The four different workloads are as follows: (1) SPEC-INT-2 k, is an integer (INT) program benchmark (version 2 k or 2000) established by the Standard Performance Evaluation Corporation (SPEC) for comparing and evaluating the performance of different Central Processing Units (CPUs) and computer systems; (2) SPEC-FP-2 k, is a floating-point (FP)

program benchmark within the SPEC version 2000; (3) SPEC-Web, is a SPEC benchmark for evaluating the World Wide Web Servers; and (4) TPC-C, is a benchmark established by the Transaction Processing Performance Council for measuring the performance of CPUs and computer systems on transaction processing workloads.

For SPEC2K (both INT and FP), the filter rates are almost equivalent, but the PFB alone provides a slightly higher accuracy and miss rate reduction. However, for both SPECWeb and TPC-C, both the filter rates and the accuracy are nearly equivalent, although the miss rate reduction for the PFB alone is slightly better. The same is true for other cache sizes as well as PFB and PBVT sizes.

TABLE 1

Comparison of PFB and PBVT for 1 MB Cache

| Workload | Accuracy | | Miss Rate Reduction | | Filter Rate | |
|---|---|---|---|---|---|---|
| | PFB = 1 k | PFB = 32 PBVT = 992 | PFB = 1 k | PFB = 32 PBVT = 992 | PFB = 1 k | PFB = 32 PBVT = 992 |
| SPEC-INT-2K | 45% | 38% | 41% | 35% | 17% | 18% |
| SPEC-FP-2K | 73% | 64% | 63% | 55% | 9% | 9% |
| SPEC-Web | 43% | 41% | 56% | 51% | 18% | 21% |
| TPC-C | 40% | 39% | 53% | 49% | 15% | 18% |
| Average | 50% | 45% | 53% | 47% | 15% | 16% |

Accordingly, the combination of a small PFB and a PBVT provides the following performance characteristics compared to same size PFB without the PBVT:

1-Higher filter rate;
2-Slightly lower accuracy;
3-Slightly lower miss rate reduction.

Thus, the performance benefits provided by a combination PFB and PBVT are virtually the same as those provided by a PFB without a PBVT.

Finally the PBVT provides nearly the same performance characteristics as the PFB but uses much less hardware. For the configurations that were examined, both the PFB and the PBVT used the same number of total entries, and thus, the same number of address tags. Regardless of the particular implementation of the tag array (associativity, line size, etc.), both options would use approximately the same amount of hardware area (assuming an equivalent number of tags and the same associativity). Thus, the PBVT provides no area savings for the tag array. However, the PBVT does provide a very significant benefit for data storage. Since the PBVT saves only the address of the cache line and not the contents, it does not use any data storage space. Table 2 shows the reduction in data storage space in terms of number of cache lines for the two options analyzed in the previous sections; PFB only and PBVT with a small PFB. For a nearly equivalent level of performance, the PBVT option provides a 50% reduction in bits of data storage space for the smaller sizes and up to a 97% reduction for the larger sizes. This is the primary benefit of using the PBVT: performance that mimics that of a large PFB with only a very small data storage structure.

TABLE 2

Reduction in Data Storage Space

| PFB Only | PBVT and PFB | | Data Storage |
|---|---|---|---|
| PFB Entries | PFB Entries | PBVT Entries | Reduction |
| 4 | 2 | 2 | 50% |
| 16 | 8 | 8 | 50% |
| 64 | 32 | 32 | 50% |
| 256 | 32 | 224 | 88% |
| 1024 | 32 | 992 | 97% |

The total die area that is saved by using a PBVT depends on the particular implementation of the tag and data arrays. For example, assume the tag array takes up half the area used by a PFB configuration. If instead, a PBVT configuration that reduces data storage space by 97% were used, there would be an overall die area savings of 48.5% (since only half the area is being reduced by 97%). In addition, a PBVT implementation will require a small amount of additional control logic that will reduce the overall die area savings. Despite the additional control logic, the PBVT provides an effective option for reducing the die area required for prefetch filtering.

What is claimed is:

1. An apparatus comprising:
   a Prefetch Buffer (PFB) to store a plurality of prefetch addresses and corresponding data;
   a Prefetch Buffer Victim Table (PBVT) to store a plurality of entries defining a history of previously evicted prefetch addresses from the PFB; and
   a controller coupled to the PFB and the PBVT, the controller to determine if a prefetch address corresponds to any one of the plurality of entries in the PBVT, and to prefetch a data corresponding to the prefetch address if the prefetch address does not correspond to at least one of the plurality of entries in the PBVT.

2. The apparatus of claim 1 further comprising:
   an execution engine to issue a memory request, the memory request including an address corresponding to a location of data in a memory; and
   the controller to receive the memory request and to generate the prefetch address according to a prefetching technique such as inline prefetching.

3. The apparatus of claim 1, wherein the controller is a prefetch controller.

4. The apparatus of claim 1, wherein the controller is a PBVT controller.

5. The apparatus of claim 1, wherein the controller further identifies a prefetch candidate based on whether the PBVT contains the prefetch address.

6. The apparatus of claim 5, wherein the PBVT also holds at least one Least Recently Used (LRU) value corresponding to each PBVT entry, the at least one LRU value indicating a relative age of the corresponding PBVT entry and the at least one LRU value being used by the controller to determine which one of the plurality of PBVT entries to evict.

7. The apparatus of claim 1, wherein the PFB is to store a plurality of entries, each entry storing the prefetch address and a corresponding data and the PFB is to evict an entry according to a replacement algorithm.

8. The apparatus of claim 7, wherein the replacement algorithm is a least recently used replacement algorithm, replacing the PFB entry which was least recently used.

9. The apparatus of claim 1, wherein the PBVT includes a plurality of registers to store a plurality of bits making up a prefetch address tag.

10. The apparatus of claim 9, wherein the plurality of registers further store a plurality of Least Recently Used (LRU) values, an LRU value to indicate a number of times the controller has searched the PBVT for a match but has not found a matching PBVT entry.

11. A method comprising:
comparing a prefetch address to a list of previously generated prefetch addresses that were evicted from a Prefetch Buffer (PFB) and stored as entries in a Prefetch Buffer Victim Table (PBVT); and
determining whether to prefetch data corresponding to the prefetch address according to the result of the comparison.

12. The method as recited in claim 11, wherein prior to comparing the prefetch address the method further comprises:
receiving a memory request from a processor, the memory request including an address of corresponding data located in a memory;
using the memory request to generate the prefetch address according to a prefetching technique; and
prefetching and storing the prefetch address and the corresponding data in the PFB if the prefetch address and the corresponding data is not already in the PFB.

13. The method of claim 12, further comprising:
searching a cache to determine whether a data corresponding to the memory request is contained in a cache and if so then returning the data to the processor.

14. The method of claim 13, wherein if the data is not contained in the cache then the method further comprises:
searching the PFB to determine if data corresponding to the memory request is contained in the PFB and if so then promoting the data to the cache; and
searching the PBVT in order to determine if the address of the memory request matches any one of the entries in the PBVT and if so then clearing the PBVT entry that matches the address of the memory request.

15. The method of claim 14, wherein searching the cache, the PFB and the PBVT is done in parallel.

16. The method of claim 14, wherein if it is determined that the PFB is full, then using a replacement algorithm to evict an entry in the PFB and to store the address of the evicted entry of the PFB in the PBVT.

17. The method of claim 13, wherein if it is determined that the data corresponding to the prefetch address is not contained in one of a set of the cache and the PFB, and that the prefetch address is not contained in the PBVT, then prefetching the data corresponding to the prefetch address and storing the prefetch address along with the corresponding data in the PFB.

18. A method to create a Prefetch Buffer Victim Table (PBVT) comprising:
determining if a prefetch address is contained within one of a set of a cache and a Prefetch Buffer (PFB);
if the prefetch address is not contained within either one of the set of the cache and the PFB, then retrieving a data stored at the prefetch address and storing the data along with the address in the PFB;
if the PFB is full, then, using a replacement algorithm, evicting an entry of the PFB and replacing the evicted entry with the prefetch address along with the data; and
storing the address of the evicted entry in the PBVT.

19. The method of claim 18, wherein prior to determining if a prefetch address is contained within one of a set of a cache and a Prefetch Buffer (PFB) the method further comprises:
receiving a memory request from a processor, the request including an address of a data located in a memory;
using a prefetching technique, predicting the prefetch address based on the address of the memory request.

20. The method of claim 19, wherein if it is determined that the address of the memory request is contained within the PBVT, then clearing the PBVT entry containing the address of the memory request.

21. The method of claim 19, wherein the prefetching technique is an inline prefetching technique.

22. The method of claim 19, wherein after receiving the memory request from the processor, the method further comprises:
searching the cache for the requested data and if the requested data is not found in the cache then searching the PFB for the requested data and if the requested data is not found in the PFB then retrieving the requested data from the memory and storing the data along with the address in the cache; and
searching the PBVT for an entry matching the address of the requested data and if a match is found then clearing the PBVT entry that matches the address of the requested data.

23. The method of claim 18, wherein the replacement algorithm is a least recently used replacement algorithm.

24. A computer system comprising:
a processor;
a memory coupled to the processor;
a cache coupled to the processor, the cache to store a plurality of cache lines; and
a controller coupled to the processor, the memory and the cache, the controller to determine whether a prefetch address tag is contained in a Prefetch Buffer (PFB) and the cache, the controller comprises
a Prefetch Buffer Victim Table (PBVT) to store a plurality of bad prefetch address tags, and
a PBVT controller to generate the prefetch address tag, the PBVT controller searches the PBVT for the prefetch address tag and will prefetch a data corresponding to the prefetch address tag if the prefetch address tag is not contained in the PBVT.

25. The computer system of claim 24, wherein the PBVT controller stores the data corresponding to the prefetch address tag in the PFB, and if the PFB is full then the PBVT controller evicts a previously prefetched data and then stores the data corresponding to the prefetch address tag.

26. The computer system of claim 25, wherein the PBVT controller evicts the previously prefetched data according to a replacement algorithm such as a least recently used replacement algorithm.

27. The computer system of claim 24, wherein the controller is a prefetch controller.

28. The computer system of claim 24, wherein the PFB evicts a previously prefetched data according to a replacement algorithm such as a least recently used replacement algorithm.

29. A computer-readable medium including a program executable by a processor, comprising:
a first subroutine to predict a prefetch address and search a cache memory for a data corresponding to the prefetch address;
a second subroutine to search a Prefetch Buffer (PFB) for the data corresponding to the prefetch address if the prefetch address is not found in the cache;

a third subroutine to retrieve the data corresponding to the prefetch address, to evict an entry of the PFB, and to replace the evicted entry with the prefetch address along with the data if the prefetch address is not found in the PFB; and a fourth subroutine to store the address of the evicted entry in a Prefetch Buffer Victim Table (PBVT).

30. The computer-readable medium of claim 29, wherein the first subroutine is to monitor the processor for a request to fetch data from a memory address and after the first subroutine detects the request, the first subroutine to use a prefetching technique to predict the prefetch address.

31. The computer-readable medium of claim 30, wherein after the first subroutine detects the request to fetch data from the memory address, a fifth subroutine is to determine if the memory address is contained in the PBVT and if it is then a sixth subroutine clears the entry.

32. The computer-readable medium of claim 29, wherein the second subroutine is to evict a previously prefetched data from the PFB according to a replacement algorithm such as a least recently used replacement algorithm.

* * * * *